March 26, 1940.    R. BRIDGFORD ET AL    2,194,735
TIRE PRESSURE SIGNAL
Filed Oct. 10, 1938    2 Sheets-Sheet 1

Reed Bridgford  Inventor
Berton A. Tibbits
George H. Sterens
Calvin Diem
By Clarence A. O'Brien
and Hyman Berman
Attorneys March 26, 1940.                R. BRIDGFORD ET AL                2,194,735
                                TIRE PRESSURE SIGNAL
                         Filed Oct. 10, 1938         2 Sheets-Sheet 2
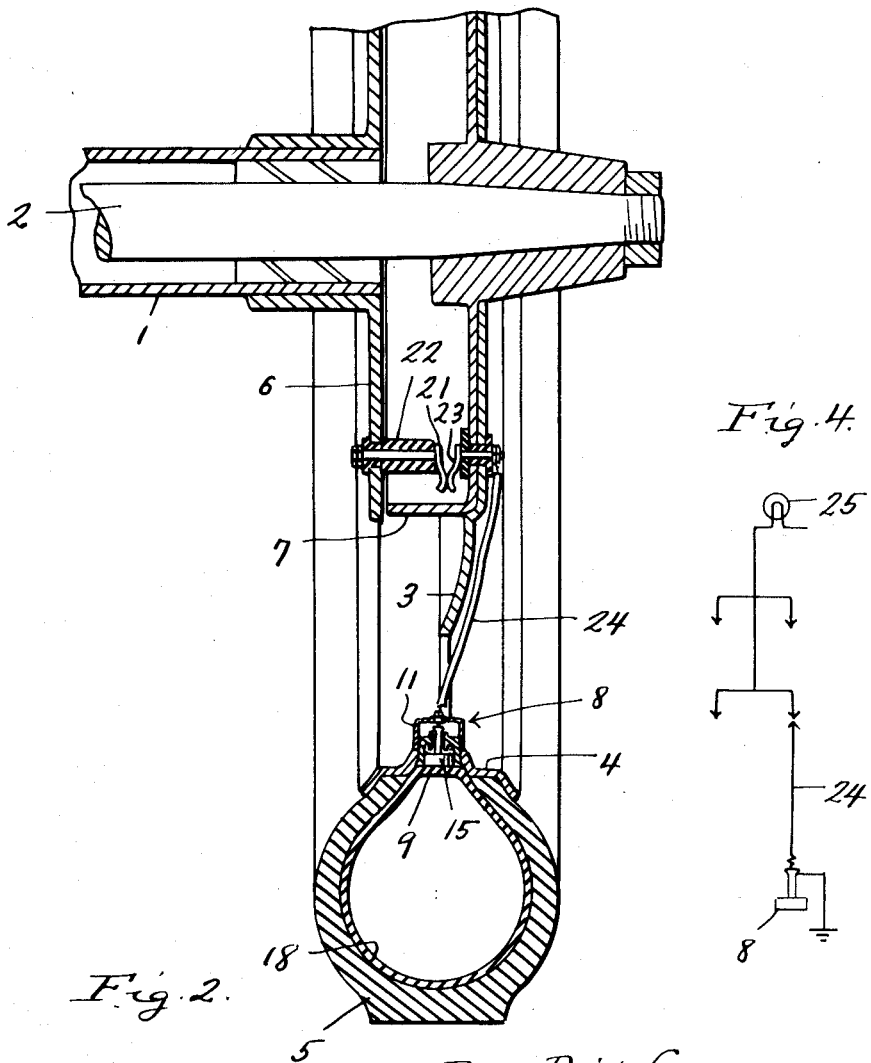

Patented Mar. 26, 1940

2,194,735

UNITED STATES PATENT OFFICE 2,194,735

TIRE PRESSURE SIGNAL

Reed Bridgford, Berton A. Tibbits, George H. Stevens, and Calvin Diehm, Rochester, Mich.

Application October 10, 1938, Serial No. 234,292

2 Claims. (Cl. 200—58)

The present invention relates to new and useful improvements in tire pressure signals particularly for automobiles and has for its primary object to provide, in a manner as hereinafter set forth, novel means for automatically indicating to the operator of the vehicle or others therein when the air in any of the pneumatic tires of said vehicle falls below a predetermined pressure.

Another very important object of the invention is to provide a pressure controlled switch of a novel construction and arrangement, one of which is mounted on each wheel of the vehicle.

Other objects of the invention are to provide a tire pressure signal of the aforementioned character which will be comparatively simple in construction, strong, durable, highly efficient and reliable in use, compact and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a sectional view, taken substantially on the line 2—2 of Fig. 1.

Figure 4 is a diagrammatic view of the wiring system.

Figure 1:
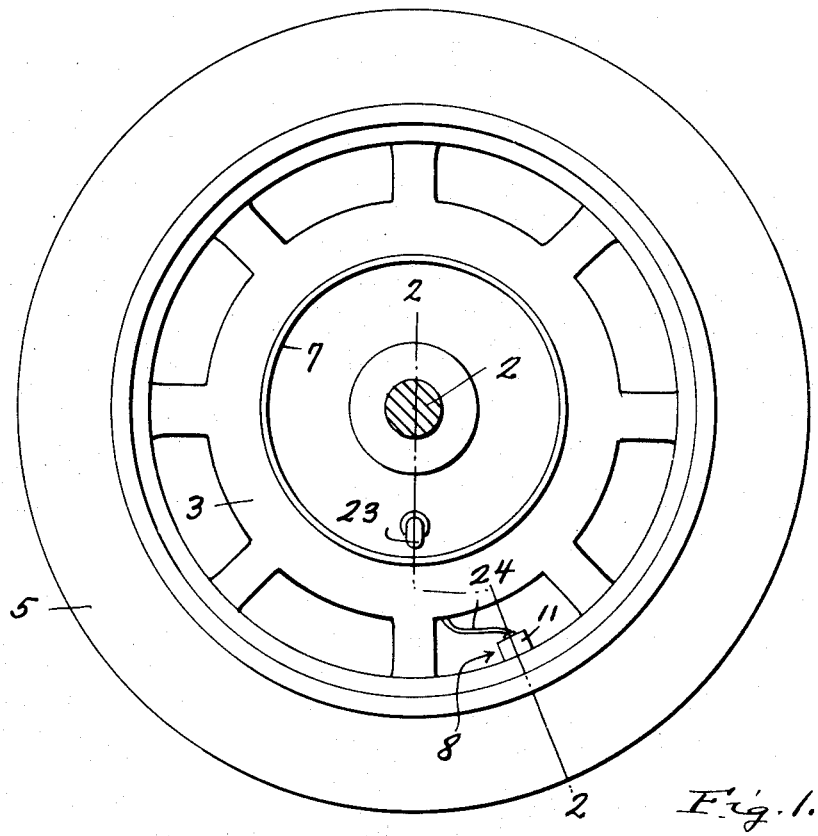
Figure 1 is an elevational view looking at the inner side of a vehicle wheel, showing an embodiment of this invention thereon.

Referring now to the drawings in detail, it will be seen that the reference numeral 1 designates a portion of the usual rear axle housing of an automobile and 2 is an axle journalled therein. Mounted on the axle 2 is a wheel 3 comprising a felloe 4 on which a pneumatic tire 5 is mounted. The reference numeral 6 designates a brake plate or flange on the housing 1 and 7 represents a brake drum on the wheel 3.

Figure 3:
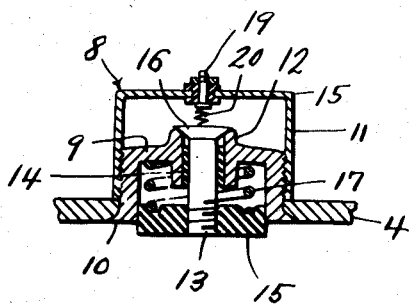
Figure 3 is a vertical sectional view through the pressure controlled switch.

The embodiment of the present invention which has been illustrated comprises a switch which is designated generally by the reference numeral 8, said switch, as illustrated to advantage in Fig. 3 of the drawings, including a cylinder or the like 9 of suitable metal which is mounted in a countersunk opening which is provided therefor in the felloe 4 of the wheel 3. It will be noted that the cylinder 9 is closed at one end and open at its other end. The cylinder 9 is inserted in the opening which is provided therefor in the felloe 4 from the outer periphery of the wheel and said cylinder has formed on its open outer end a retaining flange 10 which is engageable with said felloe. The cylinder 9 is externally threaded for receiving a removable cap 11. As also shown to advantage in Fig. 3 of the drawings, the cap 11 substantially encloses the cylinder 9 and is engageable with the felloe 4 for coaction with the flange 10 for securing said cylinder in position in said felloe.

The closed end of the cylinder 9 is formed to provide a longitudinal sleeve 12 which is open at both ends and slidably operable in said sleeve is a stem 13 of suitable metal. The stem 13 is insulated from the sleeve 12 by a bushing 14.

Threadedly mounted on one end portion of the stem 13 for reciprocation in the cylinder 9 is a piston 15 of suitable insulating material. On the other end of the stem 13 is a substantially conical head 16 which is engageable with a seat provided therefor on the adjacent end of the sleeve 12. A coil spring 17 in the cylinder 9 yieldingly urges the piston 15 outwardly toward the inner tube 18 of the pneumatic tire 5.

Mounted on the cap 11 and insulated therefrom is a binding post 19. A conductor spring 20 is fixed in any suitable manner on the inner end of the binding post 19 and said spring engages the head 16 of the stem 13 for electrically connecting said binding post thereto at all times.

Mounted on the brake plate 6 and located within the drum 7 is a contact 21. The contact 21 is insulated from the brake plate 6, as at 22. Mounted in the drum 7 and insulated therefrom is a brush 23 which is engageable with the contact 21 as the wheel 3 rotates. A conductor wire 24 electrically connects the brush 23 with the binding post 19 on the cap 11. In Fig. 4 of the drawings, the reference numeral 25 designates a signal light which is mounted at any suitable point in the vehicle within view of the operator thereof, such as on the instrument board.

It is thought that the operation of the invention will be readily apparent from a consideration of the foregoing. Briefly, it may be stated as follows:

The pressure in the tire is normally sufficient to force the piston 15 into the cylinder 9 against the tension of the coil spring 17, thus disengaging the head 16 of the stem 13 from the sleeve 12 thereby breaking the electric circuit in which the signal lamp 25 is interposed. However, should the air in the tire fall below a predetermined pressure the piston 15 is actuated by the coil spring 17 and the head 16 is engaged with the sleeve 12 thereby closing the circuit and periodically energizing the signal light 25 when the brush 23 engages the contact 21 with each revolution of the wheel 3. Of course, the apparatus shown in Fig. 2 of the drawings is installed on each wheel of the vehicle. An audible electric signal may be substituted for the electric lamp 25 or, if desired, both may be used. When the tire is again inflated to the proper pressure the piston 15 is again forced inwardly in the cylinder 9 for disengaging the head 16 from the sleeve 12.

It is believed that the many advantages of a tire pressure signal constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In combination with a vehicle wheel including a felloe having an opening therein and a pneumatic tire mounted on said felloe, an electric signal switch mounted on the felloe and including a metallic cylinder mounted in the opening, said cylinder being open at one end and closed at its other end, an integral sleeve extending through the closed end of the cylinder, a stem extending slidably through said sleeve and insulated therefrom, a piston, operable by the air pressure in the pneumatic tire, mounted on the stem and slidable in the cylinder, a head on one end of the stem engageable with the sleeve, a coil spring in the cylinder engaged with the piston for actuating said piston against the pressure of the air in the tire for engaging the head with the sleeve.

2. In combination with a vehicle wheel including a felloe having an opening therein and a pneumatic tire mounted thereon, an electric signal switch including a metallic cylinder mounted in the opening, said cylinder being closed at one end and open at its other end, a flange on the open end of the cylinder engaged with the outer periphery of the felloe, a longitudinal sleeve in the closed end of the cylinder, a stem extending slidably through said sleeve and insulated therefrom, a piston of insulating material mounted on one end portion of the stem and slidable in the cylinder, said piston being operable in one direction by the pressure of air in the pneumatic tire, a head of current conducting material on the other end of the stem and engageable with the sleeve, a coil spring mounted in the cylinder and engaged with the piston for actuating said piston in the opposite direction against the pressure of the air in the tire and for engaging the head with the sleeve, a cap threadedly mounted on the cylinder and engageable with the inner periphery of the felloe and, in conjunction with the flange, constituting means for securing the cylinder in the opening.

GEORGE H. STEVENS,
BERTON A. TIBBITS,
CALVIN DIEHM,
REED BRIDGFORD.